United States Patent
Heuer et al.

(10) Patent No.: US 7,250,483 B2
(45) Date of Patent: Jul. 31, 2007

(54) INHIBITION OF CATALYTICALLY ACTIVE IMPURITIES IN POLYCARBONATE BY THE MELT TRANSESTERIFICATION PROCESS

(75) Inventors: Helmut-Werner Heuer, Krefeld (DE); Melanie Möthrath, Düsseldorf (DE); Peter Snobl, Duisburg (DE); Lothar Bunzel, Kempen (DE); Thomas Pfingst, Tönisvorst (DE); Marc Buts, Duffel (BE); Lydia Simon, Shanghai (CN)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/169,101

(22) Filed: Jun. 28, 2005

(65) Prior Publication Data

US 2006/0004178 A1    Jan. 5, 2006

(30) Foreign Application Priority Data

Jul. 1, 2004    (DE) .................. 10 2004 032 125
Nov. 27, 2004    (DE) .................. 10 2004 057 348

(51) Int. Cl.
*C08G 64/00* (2006.01)

(52) U.S. Cl. .................. 528/196; 422/131; 422/160; 422/177; 423/243.08; 423/244.06; 528/198; 528/370; 528/372

(58) Field of Classification Search .............. 422/131, 422/160, 177; 423/243.08, 244.06; 528/196, 528/198, 370, 372

See application file for complete search history.

(56) References Cited

U.S. PATENT DOCUMENTS

| 4,104,264 | A | * | 8/1978 | Dixon et al. ................. 528/370 |
| 5,606,007 | A | | 2/1997 | Sakashita et al. ........... 528/176 |
| 5,644,017 | A | * | 7/1997 | Drumright et al. .......... 528/196 |
| 5,674,968 | A | * | 10/1997 | Drumright et al. .......... 528/173 |
| 6,613,128 | B1 | | 9/2003 | Simonaru et al. ............. 95/260 |
| 2005/0131197 | A1 | | 6/2005 | Hucks et al. ................ 528/196 |

FOREIGN PATENT DOCUMENTS

| DE | 1 031 512 | | 6/1958 |
| DE | 44 38 545 A1 | | 5/1996 |
| JP | 63051429 | * | 3/1988 |
| JP | 07224161 | * | 8/1995 |
| WO | 02/46272 A2 | | 6/2002 |

* cited by examiner

*Primary Examiner*—Terressa Boykin
(74) *Attorney, Agent, or Firm*—Joseph C. Gil; Aron Preis

(57) ABSTRACT

An improvement to the melt transesterification process for the preparation of polycarbonate is disclosed. The improvement entails adding to the process between its medium viscosity reactor and a high viscosity reactor at least one bridged ester of organic sulphur-containing acid.

3 Claims, No Drawings

INHIBITION OF CATALYTICALLY ACTIVE IMPURITIES IN POLYCARBONATE BY THE MELT TRANSESTERIFICATION PROCESS

FIELD OF THE INVENTION

The invention relates to a process for the preparation of polycarbonate, and particularly to the melt transesterification process.

BACKGROUND OF THE INVENTION

The preparation processes for polycarbonate are known in the literature and described in many applications:

For the preparation of polycarbonates by the interfacial or melt transesterification process, reference is made, for example, to "Schnell", Chemistry and Physics of Polycarbonates, Polymer Reviews, Vol. 9, Interscience Publishers, New York, London, Sydney 1964, p. 33 ff and to Polymer Reviews, Volume 10, "Condensation Polymers by Interfacial and Solution Methods", Paul W. Morgan, Interscience Publishers, New York 1965, Chap. VIII, p. 325 and EP-A 971790.

After their preparation, melt polycarbonates may contain catalytically active, basic impurities. These may be caused on the one hand by slight impurities in the starting substances that have not been separated off, by basic residues of thermally decomposable catalysts that have not been separated off, or by stable basic catalyst salts that have not been separated off. Thermally decomposable catalysts are to be understood as being, for example, so-called onium salts. Thermally stable catalysts are to be understood as being, for example, alkali or alkaline earth salts. Such basic substances in the polycarbonate are highly undesirable because they support a catalytic activity of the material.

Accordingly, when additives are mixed into the polycarbonate melt, basic substances may support chemical reactions of the additives, such as, for example, incorporation into the polymer chain and degradation of the additives, which adversely affect the effectiveness of the additives. The thermal reduction of the residual monomers at constant molecular weight, which is conventional in the case of optical melt polycarbonate types, is also not successful in the presence of catalytically active, basic impurities (literature reference LeA 36 697). Catalytically active compounds in the polycarbonate lead further to degradation reactions of the polycarbonate during conventional steps of further processing, such as, for example, injection molding.

For this reason, inhibitors are conventionally added to the polycarbonates. Inhibitors are understood as being all compounds that inhibit the kinetics of chemical reactions, so that quality-reducing changes in the polymer are avoided.

The deactivation of the catalytically active, basic impurities in the melt polycarbonate with the aid of acidic compounds and their esters is known in the literature. It is extremely important in this case that the inhibitors used do not form excess free acids, because these likewise support chemical reactions of the polymers, for example with the additives.

In DE-A 1 031 512, Schnell et al. describe the neutralisation of basic catalysts by addition of acidic components. It is also mentioned therein that, after the neutralisation, it is possible to remove excess acid that has been used by applying a vacuum.

EP-A 435 124 describes the deactivation of alkaline catalysts in the melt polycarbonate by addition of an acid or a simple acid ester of an acid that contains a sulfur atom. In this case, the excess acid is neutralised again by addition of epoxides, before reduction of residual monomers in vacuo. Examples of acidic components that are disclosed include phosphoric acid, toluenesulfonic acid, methyl tosylate and ethyl tosylate.

DE-A 4 438 545 describes mixing a melt polycarbonate with an acidic component, or an ester thereof, having a pKa value <5 in order to neutralise the basic transesterification catalyst before reduction of the residual monomers in vacuo. Phosphoric acid, toluenesulfonic acid and corresponding esters are described as examples of acidic components.

In WO 00 07799, before reduction of the residual monomers of a melt polycarbonate in vacuo, the alkaline catalysts are inhibited by addition of onium salts, such as tetraalkylphosphonium and tetraalkylammonium salts, of dodecylbenzenesulfonic acid.

From WO 02 46272 there is known the use of a combination of S-containing quenchers with phosphoric acid and water and glycerol monostearate (GMS) for melt polycarbonate. In this manner, with precisely matched addition, the residual monomers may be removed, and GMS may be added as mold release agent without an undesired secondary reaction. The effective quenchers that are described include simple alkyl-benzene- and toluene-sulfonic acid esters as well as phosphonium and ammonium salts of p-substituted benzenesulfonic acids. Butyl tosylate is preferably used.

Many of the described deactivators, in particular the free acids and readily cleavable esters, have the disadvantage of corrosive properties at high temperatures and concentration, as may occur, for example, in the case of industrial metering of the inhibitors. It is highly advantageous to use inhibitors that do not affect the materials of the apparatus, in order to prevent particles, metal cations and deficiencies in terms of safety. Furthermore, the majority of the described quenchers are volatile under the conditions conventionally employed in the units for residual monomer removal in the case of melt polycarbonate and in the case of metering into the molten stream of the melt polycarbonate. If the residual monomers are removed with relatively long residence times at elevated temperatures and in vacuo, a large part of the quenchers may be lost and the efficiency of the quenchers may thus be greatly reduced. The indispensable constant and clean metering of the quenchers into the melt stream, with continuous mixing, is likewise made considerably more difficult by high volatility. The added components, such as, for example, phosphoric acid, may additionally be separated from the polycarbonate with the other volatile constituents in the subsequent degassing step and may become concentrated in the installation, leading to damage to the installation as a result of corrosion. When the components that have been separated off, including the components that inhibit the activity of the catalyst, are fed back into the installation circuit, disadvantageous effects on the implementation of the reaction are additionally to be expected. For example, a catalyst quencher may be fed back into the polycarbonate preparation process and thus inhibit the progress of the reaction. Corrosive damage may also occur in the evaporating system, in which the compounds that have been separated off are worked up.

Although quaternary onium salts of para-substituted benzenesulfonic acids, as described in WO 00 07799, are less volatile, they exhibit a striking disadvantage owing to their low solubility in solvents that are preferably used. According to WO 00 07799, they must therefore be dispersed in water in a complex operation for the purposes of metering. The continuously constant metering of a suspension in extremely small amounts is regarded as difficult from an industrial point of view. Solvents that are preferably used are understood as being water and solvents that are inherent in the process, such as phenol.

A further disadvantage of many acid ester quenchers is that they too rapidly generate large amounts of free acids. An excess of free acid catalyses reactions of the polycarbonates with additives, for example, or even promotes reverse reactions of the polycarbonate with phenol, with the liberation of diphenyl carbonate. On the other hand, small amounts of excess ester-bonded acid, which release the free acid very slowly when exposed to heat during further processing of the quenched polycarbonate, are thoroughly desirable. They increase the thermal load capacity of the polycarbonate.

The object was therefore, starting from the prior art, to find inhibitors for quenching catalytically active impurities in the polycarbonate, which inhibitors are not corrosive and have low volatility and at the same time may readily be dissolved and metered in solvents that are inherent in the process. Likewise, the inhibitors should never generate relatively great excesses of free acid in the polycarbonate, in order to avoid degradation reactions of polycarbonate with formation of carbonates or to suppress reactions with the additives. Instead, slow generation of the free acids is desirable. It is particularly desirable that the inhibitor should not form all the possible free acid completely during incorporation into the polycarbonate and any subsequent steps. In this manner, it may exhibit activity again during further processing after granulation of the quenched polycarbonate, such as, for example, injection molding.

SUMMARY OF THE INVENTION

An improvement to the melt transesterification process for the preparation of polycarbonate is disclosed. The improvement entails adding to the process between its medium viscosity reactor and a high viscosity reactor at least one bridged ester of organic sulphur-containing acid.

DETAILED DESCRIPTION OF THE INVENTION

Surprisingly, it has now been found that esters of organic sulfur-containing acids combine the desired properties in a balanced manner and are excellently suitable for inhibiting catalytically active impurities in polycarbonates. Surprisingly, such stabilizers therefore release the corresponding free acids only slowly and in stages. Moreover, they are themselves of such low volatility that they scarcely evaporate from the polycarbonate melt even with relatively long residence times. Surprisingly, the stabilizers do not corrode the metals that are conventionally employed, such as, for example, 1.4571 or 1.4541 (Stahlschlüssel 2001, Verlag: Stahlschlüssel Wegst GmbH, Th-Heuss-Straβe 36, D-71672 Marbach) and type C Ni-based alloys, such as, for example, 2.4605 or 2.4610 (Stahlschlüssel 2001, Verlag: Stahlschlüssel Wegst GmbH, Th-Heuss-Straβe 36, D-71672 Marbach), even at high temperatures and concentrations.

This is particularly astonishing because it is generally not possible in the case of the inhibition of catalytically active impurities in polycarbonates to predict whether the inhibitors combine the desired properties, such as low volatility, solubility in solvents that are inherent in the process, freedom from corrosion and slow release of acid, in the correct measure.

This invention accordingly provides a process for the preparation of polycarbonate; characterised in that esters of organic sulfur-containing acids are added between medium- and high-viscosity reactors.

The invention further provides the use of esters of organic sulfur-containing acids for inhibiting catalytically active impurities in the case of the preparation of polycarbonate by the melt transesterification process.

Preferred inhibitors that are suitable according to the invention are one or more esters of organic sulfur-containing acids, selected from the group consisting of compounds conforming to formula (I)

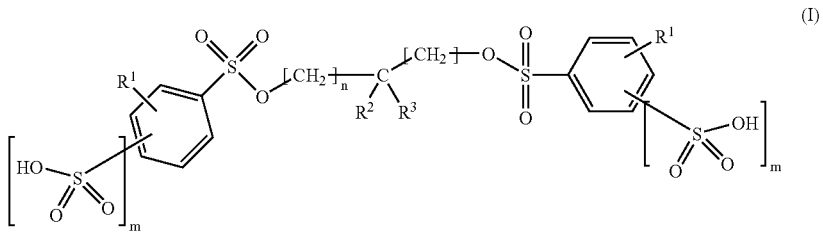

in which the substituents $R^1$ independently of one another represent hydrogen or $C_1$-$C_{20}$-alkyl, preferably $C_1$-$C_8$-alkyl, particularly preferably unsubstituted $C_1$-$C_6$-alkyl, very particularly preferably $C_1$-$C_4$-alkyl, alkyl is optionally substituted by halogen, especially by hydrogen or by methyl, $R^2$ and $R^3$ independently of one another represent hydrogen or $C_1$-$C_6$-alkyl, $C_4$-$C_{30}$-alkylcarboxyl, preferably $C_1$-$C_4$-alkyl, $C_6$-$C_{25}$-alkylcarboxyl, particularly preferably $C_8$-$C_{20}$-alkylcarboxyl, especially hydrogen, $C_{17}$-alkylcarboxyl or $C_{15}$-alkylcarboxyl or $R^2$ and $R^3$ represent the radical

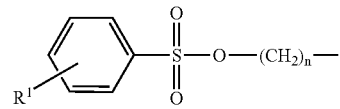

wherein $R^1$ has the meaning given above, the substituents m independently of one another represent 0 or 1, n represents an integer from 0 to 8, preferably from 0 to 6, especially 0, 1 or 2, m=0 or 1 b) of formula (II)

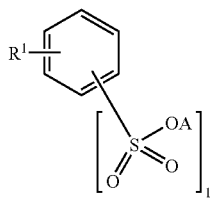
(II)

in which

R¹ has the meaning given above, the substituents A independently of one another represent hydrogen or $C_1$-$C_{12}$-alkyl, preferably $C_1$-$C_8$-alkyl, particularly preferably ethyl, propyl or butyl, I represents 2 or 3, of formula

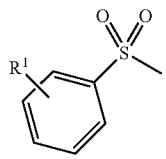
(III)

in which

R¹ has the meaning given above and of formula (IV)

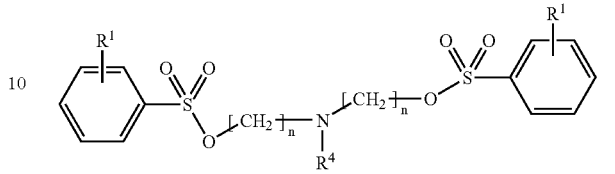
(IV)

in which

R¹ and n have the meaning given above, and

R⁴ represents $C_4$-$C_{30}$-alkylcarboxyl, preferably $C_6$-$C_{25}$-alkylcarboxyl, particularly preferably $C_8$-$C_{20}$-alkylcarboxyl, especially $C_{17}$-alkylcarboxyl or $C_{15}$-alkylcarboxyl or represents the following radical wherein R¹ has the meaning given above, and e) of formula (V), (VI), (VIIa), (VIIb), (Ib), (IVa)

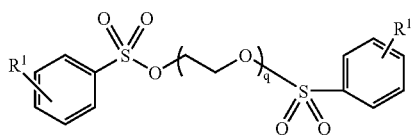
(V)

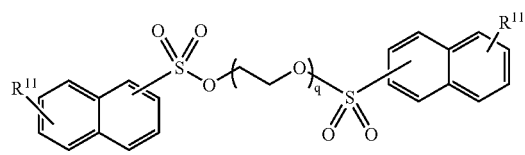
(VI)

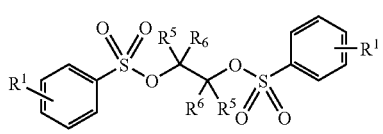
(VIIa)

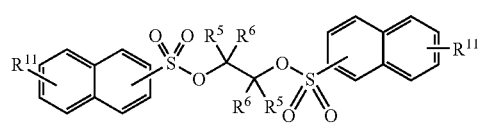
(VIIb)

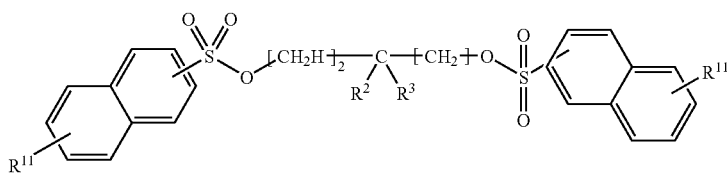
(IB)

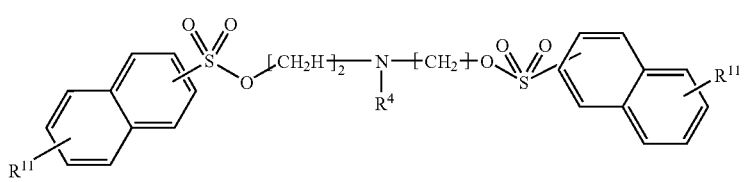
(IVa)

in which

R$^1$ and n have the meaning given above, and q represents an integer from 0 to 10, preferably from 1 to 8, especially from 1 to 5, and R$^5$ and R$^6$ independently of one another represent hydrogen or C$_1$-C$_{20}$-alkyl, preferably C$_1$-C$_8$-alkyl, particularly preferably C$_1$-C$_6$-alkyl, very particularly preferably C$_1$-C$_4$-alkyl, it being possible for alkyl to be substituted by halogen, especially hydrogen or methyl, and the substituents R$^{11}$ independently of one another represent hydrogen or di-(C$_1$-C$_4$)-alkylamino, preferably hydrogen or dimethylamino, and f) of formula (VIII)

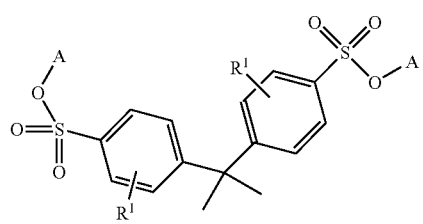
(VIII)

in which

R$^1$ and A have the meaning given above and g) of formula (IX)

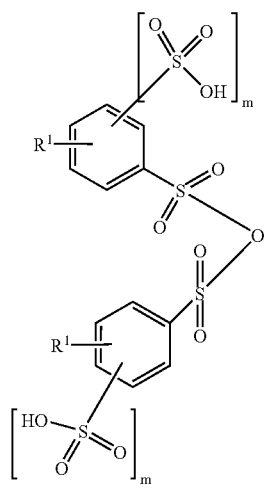
(IX)

in which

R$^1$ and m have the meaning given above and h) of formula (X)

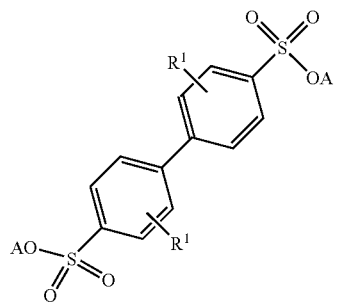
(X)

in which

R$^1$ and A have the meaning given above and i) of formula (XI)

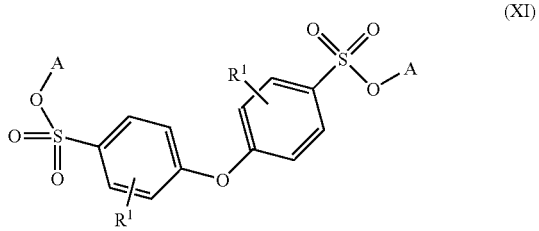
(XI)

in which

R$^1$ and A have the meaning given above.

Very particular preference is given to the following inhibitors of formulae (Ia) to (If), (IIIa), (IVb), (Va), (Vb) and (IXa):

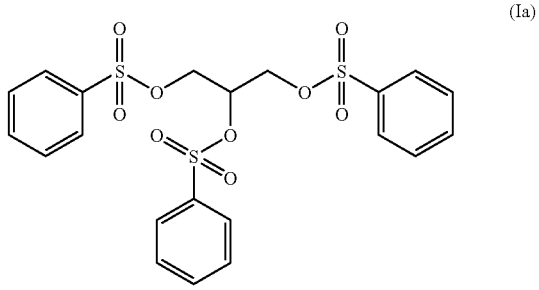
(Ia)

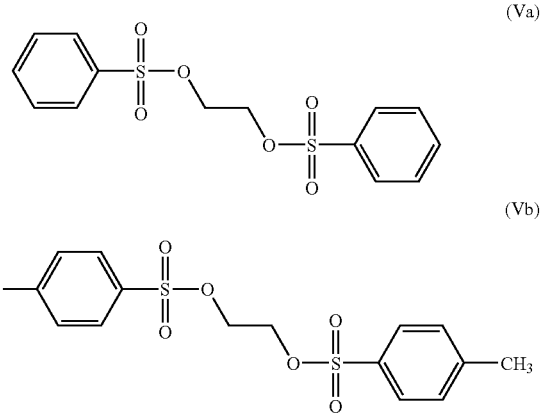
(Va)

(Vb)

The inhibitors according to the invention may be added to the polymer melt individually or in any desired mixtures or a plurality of different mixtures. The inhibitors according to the invention may also be added in the form of mixtures with free acids, such as, for example, para-toluenesulfonic acid or ortho-phosphoric acid. The preparation of the bridged esters of organic sulfur-containing acids according to the invention is carried out according to conventional methods, for example by alcoholysis from benzenesulfonic acid chloride or toluenesulfonic acid chloride with the appropriate polyfunctional alcohols (see Organikum, Wiley-VCH Verlag, 20th Edition, Weinheim, p. 606/1999).

The polycarbonate may be prepared, for example, according to the melt transesterification process. The preparation of aromatic oligo- or poly-carbonates according to the melt transesterification process is known in the literature and prior-described, for example, in Encyclopedia of Polymer Science, Vol. 10 (1969), Chemistry and Physics of Polycarbonates, Polymer Reviews, H. Schnell, Vol. 9, John Wiley and Sons, Inc. (1964) and also in DE-C 10 31 512, U.S. Pat. No. 3,022,272, U.S. Pat. No. 5,340,905 and U.S. Pat. No. 5,399,659.

According to this process, aromatic dihydroxy compounds are transesterified in the melt with carbonic acid diesters with the aid of suitable catalysts and optionally further additives.

In order to carry out the process it is possible to use, for example, an installation of the type described in WO 02/077 067 (corresponding to U.S. Patent Applications 2004526839; 2002177684 and 2004143088 all incorporated herein by reference).

Suitable dihydroxyaryl compounds for the preparation of polycarbonates are those of formula (XII)

in which Z is an aromatic radical having from 6 to 30 carbon atoms which may contain one or more aromatic nuclei, may be substituted and may contain aliphatic or cycloaliphatic radicals or alkylaryls or hetero atoms as bridging members.

Examples of dihydroxyaryl compounds are: dihydroxybenzenes, dihydroxydiphenyls, bis-(hydroxyphenyl)-alkanes, bis-(hydroxyphenyl)-cycloalkanes, bis-(hydroxyphenyl)-aryls, bis-(hydroxyphenyl) ethers, bis-(hydroxyphenyl) ketones, bis-(hydroxyphenyl) sulfides, bis-(hydroxyphenyl)-sulfones, bis-(hydroxyphenyl)-sulfoxides, 1,1'-bis-(hydroxyphenyl)-diisopropyl-benzenes, and compounds thereof alkylated and halogenated on the ring.

These and further suitable other dihydroxyaryl compounds are described, for example, in U.S. Pat. Nos. 2,970,131, 2,991,273, 2,999,835, 2,999,846, 3,028,365, 3,062,781, 3,148,172, 3,271,367, 3,275,601, 4,982,014, in German patent specifications 1 570 703, 2 063 050, 2 036 052, 2 211 956, 3 832 396, in French patent specification 1 561 518 and in the monograph "H. Schnell, Chemistry and Physics of Polycarbonates, Interscience Publishers, New York 1964", p. 28 ff; p. 102 ff", and in "D. G. Legrand, J. T. Bendler, Handbook of Polycarbonate Science and Technology, Marcel Dekker New York 2000, p. 72 ff".

Preferred dihydroxyaryl compounds are, for example: resorcinol, 4,4'-dihydroxy-diphenyl, bis-(4-hydroxyphenyl)-methane, bis-(3,5-dimethyl-4-hydroxyphenyl)-methane, bis-(4-hydroxyphenyl)-diphenyl-methane, 1,1-bis-(4-hydroxyphenyl)-1-phenyl-ethane, 1,1-bis-(4-hydroxyphenyl)-1-(1-naphthyl)-ethane, 1,1-bis-(4-hydroxyphenyl)-1-(2-naphthyl)-ethane, 2,2-bis-(4-hydroxyphenyl)-propane, 2,2-bis-(3-methyl-4-hydroxyphenyl)-propane, 2,2-bis-(3,5-dimethyl-4-hydroxyphenyl)-propane, 2,2-bis-(4-hydroxyphenyl)-1-phenyl-propane, 2,2-bis-(4-hydroxyphenyl)-hexafluoro-propane, 2,4-bis-(4-hydroxyphenyl)-2-methyl-butane, 2,4-bis-(3,5-dimethyl-4-hydroxyphenyl)-2-methyl-butane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-4-methyl-cyclohexane, 1,1-bis-(4-hydroxyphenyl)-3,3,5-trimethyl-cyclohexane, 1,3-bis-[2-(4-hydroxyphenyl)-2-propyl]-benzene, 1,1'-bis-(4-hydroxy-phenyl)-3-diisopropyl-benzene, 1,1'-bis-(4-hydroxyphenyl)-4-diisopropyl-benzene, 1,3-bis-[2-(3,5-dimethyl-4-hydroxyphenyl)-2-propyl]-benzene, bis-(4-hydroxyphenyl) ether, bis-(4-hydroxyphenyl) sulfide, bis-(4-hydroxyphenyl)-sulfone, bis-(3,5-dimethyl-4-hydroxyphenyl)-sulfone and 2,2',3,3'-tetrahydro-3,3,3',3'-tetramethyl-1,1'-spirobi-[1H-indene]-5,5'-diol.

Particularly preferred dihydroxyaryl compounds are: resorcinol, 4,4'-dihydroxydiphenyl, bis-(4-hydroxyphenyl)-diphenyl-methane, 1,1-bis-(4-hydroxyphenyl)-1-phenylethane, bis-(4-hydroxyphenyl)-1-(1-naphthyl)-ethane, bis-(4-hydroxyphenyl)-1-(2-naphthyl)-ethane, 2,2-bis-(4-hydroxyphenyl)-propane, 2,2-bis(3,5-dimethyl-4-hydroxyphenyl)-propane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-3,3,5-trimethyl-cyclohexane, 1,1'-bis-(4-hydroxyphenyl)-3-diisopropyl-benzene and 1,1'-bis-(4-hydroxyphenyl)-4-diisopropyl-benzene.

Very particular preference is given to: 4,4'-dihydroxydiphenyl, 2,2-bis-(4-hydroxyphenyl)-propane and bis-(4-hydroxyphenyl)-3,3,5-trimethyl-cyclohexane.

It is possible to use either one dihydroxyaryl compound, with formation of homopolycarbonates, or different dihydroxyaryl compounds, with formation of copolycarbonates.

Instead of the monomeric dihydroxyaryl compounds, it is also possible to use low molecular weight, predominantly OH-end-group-stopped oligocarbonates as the starting material.

The dihydroxyaryl compounds may also be used with residual contents of the monohydroxyaryl compounds from which they were prepared, or the low molecular weight oligocarbonates may be used with residual contents of the monohydroxyaryl compounds separated off during the preparation of the oligomers. The residual contents of the monohydroxyaryl compounds may be up to 20%, preferably 10%, particularly preferably up to 5% and very particularly preferably up to 2% (see e.g. EP-A 1 240 232).

The dihydroxyaryl compounds used, like all the other raw materials, chemicals and auxiliary substances added to the synthesis, may be contaminated by impurities originating from their own synthesis, handling and storage, although it is desirable and intended to use raw materials, chemicals and auxiliary substances that are as clean as possible.

The diaryl carbonates suitable for reaction with the dihydroxyaryl compounds are those of formula (XIII)

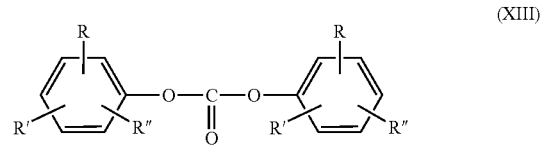

wherein R, R' and R", independently of one another, may be identical or different and represent hydrogen, optionally branched $C_1$-$C_{34}$-alkyl, $C_7$-$C_{34}$-alkylaryl or $C_6$-$C_{34}$-aryl, R may further also represent —COO—R''', R''' representing hydrogen, optionally branched $C_1$-$C_{34}$-alkyl, $C_7$-$C_{34}$-alkylaryl or $C_6$-$C_{34}$-aryl.

Such diaryl carbonates are, for example: diphenyl carbonate, methylphenyl-phenyl carbonates and di-(methylphenyl) carbonates, 4-ethylphenyl-phenyl carbonate, di-(4-ethylphenyl) carbonate, 4-n-propylphenyl-phenyl carbonate, di-(4-n-propyl-phenyl) carbonate, 4-isopropylphenyl-phenyl carbonate, di-(4-isopropylphenyl) carbonate, 4-n-butylphenyl-phenyl carbonate, di-(4-n-butylphenyl) carbonate, 4-isobutylphenyl-phenyl carbonate, di-(4-isobutylphenyl) carbonate, 4-tert.-butyl-phenyl-phenyl carbonate, di-(4-tert.-butylphenyl) carbonate, 4-n-pentylphenyl-phenyl carbonate, di-(4-n-pentylphenyl) carbonate, 4-n-hexylphenyl-phenyl carbonate, di-(4-n-hexylphenyl) carbonate, 4-isooctylphenyl-phenyl carbonate, di-(4-isooctylphenyl) carbonate, 4-n-nonylphenyl-phenyl carbonate, di-(4-n-nonyl-phenyl) carbonate, 4-cyclohexylphenyl-phenyl carbonate, di-(4-cyclohexylphenyl) carbonate, 4-(1-methyl-1-phenylethyl)-phenyl-phenyl carbonate, di-[4-(1-methyl-1-phenylethyl)- phenyl] carbonate, biphenyl-4-yl-phenyl carbonate, di-(biphenyl-4-yl) carbonate, 4-(1-naphthyl)-phenyl-phenyl carbonate, 4-(2-naphthyl)-phenyl-phenyl carbonate, di-[4-(1-naphthyl)phenyl] carbonate, di-[4-(2-naphthyl)phenyl] carbonate, 4-phenoxyphenyl-phenyl carbonate, di-(4-phenoxyphenyl) carbonate, 3-pentadecylphenyl-phenyl carbonate, di-(3-pentadecylphenyl) carbonate, 4-tritylphenyl-phenyl carbonate, di-(4-tritylphenyl) carbonate, methylsalicylate phenyl carbonate, di-(methylsalicylate) carbonate, ethylsalicylate phenyl carbonate, di-(ethyls alicylate) carbonate, n-propylsalicylate phenyl carbonate, di-(n-propyl-salicylate) carbonate, isopropylsalicylate phenyl carbonate, di-(isopropylsalicylate) carbonate, n-butylsalicylate phenyl carbonate, di-(n-butylsalicylate) carbonate, isobutylsalicylate phenyl carbonate, di-(isobutylsalicylate) carbonate, tert.-butyl-salicylate phenyl carbonate, di-(tert.-butylsalicylate) carbonate, di-(phenylsalicylate) carbonate and di-(benzylsalicylate) carbonate.

Preferred diaryl compounds are: diphenyl carbonate, 4-tert.-butylphenyl-phenyl carbonate, di-(4-tert.-butylphenyl) carbonate, biphenyl-4-yl-phenyl carbonate, di-(biphenyl-4-yl) carbonate, 4-(1-methyl-1-phenylethyl)-phenyl-phenyl carbonate and di-[4-(1-methyl-1-phenylethyl)-phenyl] carbonate.

Particular preference is given to: diphenyl carbonate.

The diaryl carbonates may also be used with residual contents of the monohydroxyaryl compounds from which they were prepared. The residual contents of the monohydroxyaryl compounds may be up to 20%, preferably 10%, particularly preferably up to 5% and very particularly preferably up to 2%.

Based on the dihydroxyaryl compound, the diaryl carbonates are generally used in an amount of from 1.02 to 1.30 mol., preferably from 1.04 to 1.25 mol., particularly preferably from 1.06 to 1.22 mol., very particularly preferably from 1.06 to 1.20 mol. per mol. of dihydroxyaryl compound. It is also possible to use mixtures of the above-mentioned diaryl carbonates.

In order to control or change the end groups, it is additionally possible to use a monohydroxyaryl compound that has not been used in the preparation of the diaryl carbonate that is employed. It is represented by the following general formula (XIV):

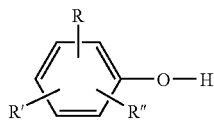

(XIV)

wherein R, R' and R" have the meaning given for formula (XIII), with the proviso that in this case R may not be H although R' and R" may be H.

Such monohydroxyaryl compounds are, for example: 1-, 2- or 3-methylphenol, 2,4-dimethylphenol 4-ethylphenol, 4-n-propylphenol, 4-isopropylphenol, 4-n-butyl-phenol, 4-isobutylphenol, 4-tert.-butylphenol, 4-n-pentylphenol, 4-n-hexylphenol, 4-isooctylphenol, 4-n-nonylphenol, 3-pentadecylphenol, 4-cyclohexylphenol, 4-(1-methyl-1-phenylethyl)-phenol, 4-phenylphenol, 4-phenoxyphenol, 4-(1-naphthyl)-phenol, 4-(2-naphthyl)-phenol, 4-tritylphenol, methyl salicylate, ethyl salicylate, n-propyl salicylate, isopropyl salicylate, n-butyl salicylate, isobutyl salicylate, tert.-butyl salicylate, phenyl salicylate and benzyl salicylate.

Preference is given to: 4-tert.-butylphenol, 4-isooctylphenol and 3-penta-decylphenol.

A suitable monohydroxyaryl compound is one whose boiling point is above that of the monohydroxyaryl compound used in the preparation of the diaryl carbonate that is employed. The monohydroxyaryl compound may be added at any time during the course of the reaction. It is preferably added at the beginning of the reaction or alternatively at any desired point during the process. The proportion of free monohydroxyaryl compound may be from 0.2 to 20 mol. %, preferably from 0.4 to 10 mol. %, based on the dihydroxyaryl compound.

The end groups may also be changed by the concomitant use of a diaryl carbonate whose base monohydroxyaryl compound has a higher boiling point than the base monohydroxyaryl compound of the diaryl carbonate that is predominantly used. Here too, the diaryl carbonate may be added at any time during the course of the reaction. It is preferably added at the beginning of the reaction or alternatively at any desired point during the process. The proportion of diaryl carbonate having the higher boiling base monohydroxyaryl compound in the total amount of diaryl carbonate used may be from 1 to 40 mol. %, preferably from 1 to 20 mol. % and particularly preferably from 1 to 10 mol. %.

The catalysts used in the melt transesterification process for the preparation of polycarbonates are the basic catalysts known in the literature, such as, for example, alkali and alkaline earth hydroxides and oxides, as well as ammonium or phosphonium salts, referred to as onium salts hereinbelow. Onium salts, particularly preferably phosphonium salts, are preferably used in the synthesis. Phosphonium salts within the scope of the invention are those of the general formula (XV)

(XV)

wherein $R^{7-10}$ may be the same or different $C_1$-$C_{10}$-alkyls, $C_6$-$C_{14}$-aryls, $C_7$-$C_{15}$-arylalkyls or $C_5$-$C_6$-cycloalkyls, preferably methyl or $C_6$-$C_{14}$-aryls, particularly preferably methyl or phenyl, and $X^-$ may be an anion such as hydroxide, sulfate, hydrogen sulfate, hydrogen carbonate, carbonate or a halide, preferably chloride, or an alkylate or arylate of the formula —OR, wherein R may be a $C_6$-$C_{14}$-aryl, $C_7$-$C_{15}$-arylalkyl or $C_5$-$C_6$-cycloalkyl, preferably phenyl.

Preferred catalysts are tetraphenylphosphonium chloride, tetraphenylphosphonium hydroxide and tetraphenylphosphonium phenolate; tetraphenylphosphonium phenolate is particularly preferred.

They are preferably used in amounts of from $10^{-8}$ to $10^{-3}$ mol., based on one mol. of dihydroxyaryl compound, particularly preferably in amounts of from $10^{-7}$ to $10^{-4}$ mol.

Further catalysts may be used alone or in addition to the onium salt as co-catalyst, in order to increase the rate of the polycondensation.

These include the alkaline-reacting salts of alkali metals and alkaline earth metals, such as hydroxides, alkoxides and aryl oxides of lithium, sodium and potassium, preferably hydroxides, alkoxides or aryl oxides of sodium. Sodium hydroxide and sodium phenolate are most preferred, as well as the disodium salt of 2,2-bis-(4-hydroxyphenyl)-propane.

The amounts of the alkaline-reacting salts of alkali metals and alkaline earth metals, alone or as co-catalyst, may be in the range from 1 to 500 ppb, preferably from 5 to 300 ppb and most preferably from 5 to 200 ppb, in each case calculated as sodium and based on polycarbonate to be formed.

It is possible to use the alkaline-reacting salts of alkali metals and alkaline earth metals during the preparation of the oligocarbonates, that is to say at the beginning of the synthesis, or to add them just before the polycondensation in order to suppress undesired secondary reactions.

It is also possible to add supplementary amounts of onium catalysts of the same type or of a different type before the polycondensation.

The addition of the catalysts takes place in solution, in order to avoid harmful overconcentrations during metering. The solvents are compounds inherent in the system and process, such as, for example, dihydroxyaryl compounds, diaryl carbonates or monohydroxyaryl compounds. Particular preference is given to monohydroxyaryl compounds, because the person skilled in the art knows that dihydroxyaryl compounds and diaryl carbonates readily change and decompose at even slightly elevated temperatures, especially under the action of a catalyst. The qualities of the polycarbonates suffer as a result. In the case of the transesterification process for the preparation of polycarbonate, which is important industrially, the preferred compound is phenol. Phenol is also appropriate because the catalyst tetraphenolphosphonium phenolate which is preferably used is isolated in the preparation as a mixed crystal with phenol.

The thermoplastic polycarbonates are described by formula (XVI)

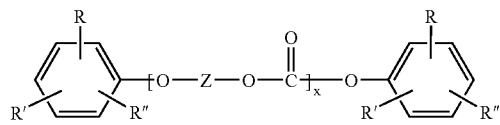

(XVI)

wherein
R, R' and R'' and Z have the meaning given for formula (IX) or (VIII),
x is a structural repeating unit and is characterised by the molecular weight of the polycarbonate.
The radical

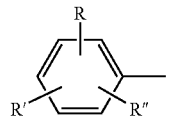

in formula (XVI) may also, as an entire group, be H and may be different on both sides.

The resulting mean weight-average molecular weights of the polycarbonates are generally from 15,000 to 40,000, preferably from 17,000 to 36,000, particularly preferably from 17,000 to 34,000, the mean weight-average molecular weight being determined by means of the relative viscosity according to the Mark-Houwing correlation (J. M. G. Cowie, Chemie und Physik der synthetischen Polymeren, Vieweg Lehrbuch, Braunschweig/Wiesbaden, 1997, page 235).

The polycarbonates have an extremely low content of cations and anions of in each case less than 60 ppb, preferably <40 ppb and particularly preferably <20 ppb (calculated at Na cation), the cations present being those of alkali and alkaline earth metals, which may originate, for example, as an impurity from the raw materials used and the phosphonium and ammonium salts. Further ions, such as Fe, Ni, Cr, Zn, Sn, Mo, Al ions and their homologues, may be present in the raw materials or originate from the materials of the installation used by wear or corrosion. The total content of such ions is less than 2 ppm, preferably less than 1 ppm and particularly preferably less than 0.5 ppm.

The anions present are those of inorganic acids and of organic acids in equivalent amounts (e.g. chloride, sulfate, carbonate, phosphate, oxalate, etc.).

Minimal amounts are therefore desired, which may only be achieved by the use of very pure raw materials. Such pure raw materials are only obtainable, for example, after purification processes such as recrystallisation, distillation, reprecipitation with washing and the like.

The polycarbonates may be branched in a targeted manner. Suitable branching agents are the compounds having three or more functional groups, preferably those having three or more hydroxyl groups, that are known for polycarbonate preparation.

Some of the compounds having three or more phenolic hydroxyl groups which may be used are, for example: phloroglucinol, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-(4,4-bis-(4-hydroxyphenyl)-cyclohexyl]-propane, 2,4-bis-(4-hydroxyphenyl-isopropyl)-phenol and tetra-(4-hydroxyphenyl)-methane.

Some of the other trifunctional compounds are: 2,4-dihydroxybenzoic acid, trimesic acid, cyanuric chloride and 3,3-bis-(3-methyl-4-hydroxyphenyl)-2-oxo-2,3-dihydroindole.

Preferred branching agents are: 3,3-bis-(3-methyl-4-hydroxyphenyl)-2-oxo-2,3-dihydroindole and 1,1,1-tri-(4-hydroxyphenyl)-ethane.

The branching agents are generally used in amounts of from 0.02 to 3.6 mol. %, based on the dihydroxyaryl compound.

The process for the preparation of polycarbonate according to the transesterification process may be discontinuous or continuous. Once the dihydroxyaryl compounds and diaryl carbonates, optionally with further compounds, are present in the form of a melt, the reaction is started in the presence of suitable catalysts. The conversion, or the molecular weight, is increased, with rising temperatures and falling pressures, in suitable apparatus and devices, by conveying away the monohydroxyaryl compound that is separated off, until the desired final state is achieved. The nature and concentration of the end groups are formed by the choice of the ratio of dihydroxyaryl compound to diaryl carbonate, the loss rate of the diaryl carbonate via the vapors and optionally added compounds, such as, for example, a higher boiling monohydroxyaryl compound, which loss rate is given by the choice of procedure or installation for preparation of the polycarbonate.

There is no limitation or restriction in respect of the manner in which, the installation in which and by which procedure the process is carried out. Furthermore, there is no particular limit or restriction as regards the temperatures, the pressures and the catalysts used to carry out the melt transesterification reaction between the dihydroxyaryl compound and the diaryl carbonate, optionally also other added reactants. Any condition is possible, provided that the chosen temperatures, pressures and catalysts permit melt transesterification with appropriately rapid removal of the monohydroxyaryl compound that is separated off.

The temperatures throughout the entire process are generally between 180 and 330° C., and the pressures are between 15 bar, absolute and 0.01 mbar, absolute. In most cases a continuous procedure is chosen because that is advantageous for the product quality.

The continuous process for the preparation of polycarbonates is preferably characterised in that one or more dihydroxyaryl compounds with the diaryl carbonate, optionally also with other added reactants, using catalysts, after preliminary condensation without separation of the monohydroxyaryl compound that forms, in a plurality of subsequent reaction vaporizer stages, with temperatures that increase stepwise and pressures that fall stepwise, the molecular weight is built up to the desired level.

The devices, apparatus and reactors suitable for the individual reaction vaporizer stages are, according to the procedure, heat exchangers, pressure relieving apparatus, separators, columns, vaporizers, stirred containers and reactors or other commercial apparatus which provide the necessary residence time at chosen temperatures and pressures. The chosen devices must permit the necessary introduction of heat and must be so constructed that they comply with the continuously increasing melt viscosities.

All the devices are connected to one another by way of pumps, pipes and valves. The pipes between all the devices should naturally be as short as possible, and the curvatures of the lines should be kept as small as possible in order to avoid unnecessarily long residence times. The external, that is to say technical, framework conditions and concerns for assemblies of chemical installations should be taken into consideration.

In order to carry out the process according to a preferred continuous procedure, either the reactants may be melted together or the solid diaryl compound may be dissolved in the diaryl carbonate melt or the solid diaryl carbonate may be dissolved in the melt of the dihydroxyaryl compound, or the two raw materials are brought together in the form of a melt, preferably directly from the preparation. The residence times of the separate melts of the raw materials, especially the residence time of the melt of the dihydroxyaryl compound, are adjusted to be as short as possible. The mixture of melts, on the other hand, may be left for a longer period without losses of quality owing to the lower melting point of the raw material mixture compared with that of the individual raw materials.

The catalyst, preferably dissolved in phenol, is then added and the melt is heated to the reaction temperature. At the beginning of the industrially important process for the preparation of polycarbonate from 2,2-bis-(4-hydroxyphenyl)-propane and diphenyl carbonate, that temperature is from 180 to 220° C., preferably from 190 to 210° C., very particularly preferably 190° C. At residence times of from 15 to 90 minutes, preferably from 30 to 60 minutes, the reaction equilibrium is established without removal of the hydroxyaryl compound that forms. The reaction may be carried out at atmospheric pressure but also, for technical reasons, at excess pressure. The preferred pressure in industrial installations is from 2 to 15 bar absolute.

The melt mixture is introduced into a first vacuum chamber, the pressure of which is adjusted to from 100 to 400 mbar, preferably from 150 to 300 mbar, and immediately thereafter is heated to the reaction-temperature or input-temperature again in a suitable device at the same pressure. During the relief operation, the hydroxyaryl compound that forms is evaporated off with any monomers still present. After a residence time of from 5 to 30 minutes in a sump receiver, optionally with recirculation at the same pressure and the same temperature, the reaction mixture is introduced into a second vacuum chamber, the pressure of which is from 50 to 200 mbar, preferably from 80 to 150 mbar, and immediately thereafter is heated in a suitable device, at the same pressure, to a temperature of from 190 to 250° C., preferably from 210 to 240° C., particularly preferably from 210 to 230° C. Here too, the hydroxyaryl compound that forms is evaporated off with any monomers still present. After a residence time of from 5 to 30 minutes in a sump receiver, optionally with recirculation by pumping, at the same pressure and the same temperature, the reaction mixture is introduced into a third vacuum chamber, the pressure of which is from 30 to 150 mbar, preferably from 50 to 120 mbar, and immediately thereafter is heated in a suitable device, at the same pressure, to a temperature of from 220 to 280° C., preferably from 240 to 270° C., particularly preferably from 240 to 260° C. Here too, the hydroxyaryl compound that forms is evaporated off with any monomers still present. After a residence time of from 5 to 20 minutes in a sump receiver, optionally with recirculation by pumping at the same pressure and the same temperature, the reaction mixture is introduced into a further vacuum chamber, the pressure of which is from 5 to 100 mbar, preferably from 15 to 100 mbar, particularly preferably from 20 to 80 mbar, and immediately thereafter is heated in a suitable device, at the same pressure, to a temperature of from 250 to 300° C., preferably from 260 to 290° C., particularly preferably from 260 to 280° C. Here too, the hydroxyaryl compound that forms is evaporated off with any monomers still present.

The number of these stages, in this case, for example, 4, may vary between 2 and 6. If the number of stages is changed, the temperatures and pressures are to be adapted accordingly in order to obtain comparable results. The relative viscosity of the oligomeric carbonate that is achieved in these stages is between 1.04 and 1.20, preferably between 1.05 and 1.15, particularly preferably between 1.06 and 1.10. After a residence time of from 5 to 20 minutes in a sump receiver, optionally with recirculation by pumping at the same pressure and the same temperature as in the last flash/evaporator stage, the oligocarbonate so produced is fed into a disk or basket reactor and condensed further at from 250 to 310° C., preferably from 250 to 290° C., particularly preferably from 250 to 280° C., at pressures of from 1 to 15 mbar, preferably from 2 to 10 mbar, with residence times of from 30 to 90 minutes, preferably from 30 to 60 minutes. The product reaches a relative viscosity of from 1.12 to 1.28, preferably from 1.13 to 1.26, particularly preferably from 1.13 to 1.24. The melt leaving this reactor is brought to the desired final viscosity or the final molecular weight in a further disk or basket reactor. The temperatures are from 270 to 330° C., preferably from 280 to 320° C., particularly preferably from 280 to 310° C., the pressure is from 0.01 to 3 mbar, preferably from 0.2 to 2 mbar, with residence times of from 60 to 180 minutes, preferably from 75 to 150 minutes. The relative viscosities are adjusted to the level necessary for the intended application and are from 1.18 to 1.40, preferably from 1.18 to 1.36, particularly preferably from 1.18 to 1.34.

The function of the two basket reactors may also be combined in one basket reactor. The vapors from all the process stages are immediately drawn off, collected and worked up. This working up is generally carried out by distillation, in order to achieve high purities of the recovered substances. This may be effected, for example, according to German Patent Application No. 10 100 404 (=U.S. Pat. No. 6,703,473 incorporated herein by reference). From an economic and ecological point of view, recovery of the monohydroxyaryl compound that is separated off in highly pure form is obvious. The monohydroxyaryl compound may be used directly in the preparation of a dihydroxyaryl compound or a diaryl carbonate.

The disk or basket reactors are distinguished by the fact that, with long residence times, they provide in the vacuum a very large surface area that is constantly renewed. In terms of geometry, the disk or basket reactors are formed according to the melt viscosities of the products. There are suitable, for example, reactors as described in DE 44 47 422 C2 and EP A 1 253 163, or twin-shaft reactors as described in WO A 99/28 370 (corresponding respectively to U.S. Pat. Nos. 5,779,986; 6,630,563 and 6,329,495 all incorporated herein by reference).

The oligocarbonates, including oligocarbonates of very low molecular weight, and the finished polycarbonates are generally conveyed by means of gear pumps, screws of different types or displacement pumps of a special type.

Particularly suitable materials for the production of the apparatus, reactors, pipes, pumps and fittings are stainless steels of the Cr Ni (Mo) 18/10 type, such as, for example, 1.4571 or 1.4541 (Stahlschlüssel 2001, Verlag: Stahlschlüssel Wegst GmbH, Th-Heuss-Straße 36, D-71672 Marbach) and Ni-based alloys of type C, such as, for example, 2.4605 or 2.4610 (Stahlschlüssel 2001, Verlag: Stahlschlüssel Wegst GmbH, Th-Heuss-Straße 36, D-71672 Marbach). Stainless steels are used at process temperatures up to about 290° C., and Ni-based alloys are used at process temperature above about 290° C.

Impurities:

Polycarbonates prepared by melt transesterification may contain catalytically active, basic impurities after their preparation. These impurities are caused on the one hand by slight impurities in the starting substances that have not been separated off, by basic residues of thermally decomposable catalysts that have not been separated off, or by stable basic catalyst salts that have not been separated off. Thermally decomposable catalysts are understood as being, for example, the above-described onium salts. Thermally stable catalysts are, for example, alkaline-reacting salts of alkaline or alkaline earth metals.

In order to inhibit the catalytically active, basic impurities, the above-described inhibitors according to the invention may be added to the polycarbonates at various times during the respective processes. There is no limit regarding the time of addition. Inhibitors are generally understood as being all compounds that inhibit the kinetics of chemical reactions in a decisive manner, so that quality-reducing changes in the polymer are avoided.

Inhibitors

The inhibitors of formulae (f) to (XI) according to the invention are preferably added once the desired molecular weight of the polycarbonate has been reached. For effective incorporation of the inhibitor, static mixers or other mixers that result in homogeneous mixing, such as, for example, extruders, are suitable. In the latter case, the heat stabilizer is added to the main polymer stream via a lateral extruder of the polymer melt, optionally together with other substances, such as, for example, mold-release agents.

The inhibitors according to the invention may be added to the polymer melt individually or in any desired mixtures with one another or in a plurality of different mixtures. In addition, it is also possible to add mixtures of the inhibitors according the invention with free sulfonic acid derivatives, such as, for example, benzene- or toluene-sulfonic acid.

The inhibitors preferably have melting points greater than 30° C., preferably greater than 40° C. and particularly preferably greater than 50° C., and boiling points at 1 mbar greater than 150° C., preferably greater than 200° C. and particularly preferably greater than 230° C.

The inhibitors according to the invention may be used in amounts of less than 10 ppm, based on the polycarbonate, preferably less than 50 ppm, based on the polycarbonate, particularly preferably less than 30 ppm and very particularly preferably less than 15 ppm.

Preferably at least 0.5 ppm, particularly preferably 1 ppm, very particularly preferably 1.5 ppm, of inhibitor or mixtures thereof is used. In particular, the inhibitors are used in amounts of from 2 to 10 ppm, based on the polycarbonate. If desired, they may also be added in the form of mixtures with free acids, such as, for example, ortho-phosphoric acid, or other additives suitable as stabilizers, such as, for example, benzene- or toluene-sulfonic acids. The amount of free acid or other inhibitors is (based on polycarbonate) up to 20 ppm, preferably up to 10 ppm, especially from 0 to 5 ppm.

There is no limitation regarding the form of addition of the inhibitors according to the invention. The esters of organic sulfur-containing acids according to the invention, or mixtures thereof, may be added to the polymer melt in the form of a solid, that is to say in the form of a powder, in solution or in the form of a melt. Another type of metering is the use of a masterbatch (preferably with polycarbonate), which may also contain further additives, such as, for example, other stabilizers or mold-release agents.

The esters of organic sulfur-containing acids according to the invention are preferably added in liquid form. Because the amounts to be metered in are very small, solutions of the bridged esters according to the invention are preferably used. Suitable solvents are those which do not interfere with the process, are chemically inert and evaporate rapidly.

Suitable solvents are all organic solvents having a boiling point at normal pressure of from 30 to 300° C., preferably from 30 to 250° C. and particularly preferably from 30 to 200° C., as well as water—including water of crystallization. Those compounds that occur in the particular processes in question are preferably chosen. Any residues that remain do not lessen the quality of the product, depending on the profile of requirements of the product to be prepared.

In addition to water, solvents are alkanes, cycloalkianes and aromatic compounds, which may also be substituted. The substituents may be aliphatic, cycloaliphatic or aromatic radicals in different combinations, as well as halogens or a hydroxyl group. Hetero atoms, such as, for example, oxygen, may also be bridging members between aliphatic, cycloaliphatic or aromatic radicals, the radicals being identical or different. Further solvents may also be ketones and esters of organic acids, as well as cyclic carbonates. The inhibitor may also be dissolved and metered in glycerol monostearate.

In addition to water, examples are n-pentane, n-hexane, n-heptane and isomers thereof, chlorobenzene, methanol, ethanol, propanol, butanol and isomers thereof, phenol, o-, m- and p-kresol, acetone, diethyl ether, dimethyl ketone, polyethylene glycols, polypropylene glycols, ethyl acetate, ethylene carbonate and propylene carbonate.

Preferably suitable for the polycarbonate process are water, phenol, propylene carbonate, ethylene carbonate and toluene.

Particularly preferably suitable are water, phenol and propylene carbonate. Free sulfonic acids and partially still esterified sulfonic acids and also alcohols are formed as degradation products of the inhibitors of formulae (I) to (VII) according to the invention.

After addition of the inhibitors according to the invention, the polycarbonate that is obtained may also be provided with further, conventional additives and added substances (e.g. auxiliary substances and reinforcing substances) for the purpose of changing properties. The addition of additives and added substances serves to lengthen the useful life (e.g. hydrolysis or degradation stabilizers), to improve color stability (e.g. heat and UV stabilizers), to simplify processing (e.g. mold release agents, flow improvers), to improve the properties in use (e.g. antistatics), to improve flame resistance, to influence the appearance (e.g. organic colorants, pigments) or to adapt the properties of the polymers to particular stresses (impact modifiers, finely divided minerals, fibrous materials, quartz flour, glass fibers and carbon fibers). These may all be combined as desired in order to establish and achieve the desired properties. Such added substances and additives are described, for example, in "Plastics Additives", R. Gachter and H. Müller, Hanser Publishers 1983.

These additives and added substances may be added to the polymer melt individually or in any desired mixtures or in a plurality of different mixtures, either directly during isolation of the polymer or after the melting of granules in a so-called compounding step.

The additives and added substances, or mixtures thereof, may be added to the polymer melt in the form of a solid, that is to say in the form of a powder, or in the form of a melt. Another type of metering is the use of masterbatches or mixtures of masterbatches of the additives or additive mixtures.

The addition of these substances is preferably carried out to the finished polycarbonate in conventional devices but, as required, may also take place at a different stage of the polycarbonate preparation process.

Suitable additives are described, for example, in Additives for Plastics Handbook, John Murphy, Elsevier, Oxford 1999 or Plastics Additives Handbook Hans Zweifel, Hanser, Munich 2001.

The examples which follow are intended to illustrate the present invention without limiting it:

EXAMPLES

The relative solution viscosity is determined in dichloromethane at a concentration of 5 g/l at 25° C.

The content of phenolic OH is obtained by IR measurement. For this purpose, a differential measurement of a solution of 2 g of polymer in 50 ml of dichloromethane compared with pure dichloromethane is carried out, and the difference in extinction at 3582 cm$^{-1}$ is determined.

GMS is understood as meaning a mixture of glycerol monopalmitate and glycerol monostearate.

The total GMS content is composed of free GMS (GMS$_{free}$), GMS carbonate (GMS-CO$_3$) and incorporated GMS. The latter is calculated by difference formation. A portion of the sample is subjected to alkaline hydrolysis at 80° C. and then adjusted to about pH 1 using hydrochloric acid. This solution is extracted with tert.-butyl methyl ether and the extract is dried. After derivatization, analysis is carried out by gas chromatography on a capillary column in conjunction with a flame ionization detector. Quantitative evaluation is effected via an internal standard and gives the total content of GMS.

Another portion of the sample is dissolved in dichloromethane and derivatized. After separation by gas chromatography on a capillary column and detection by means of flame ionization detector (FID), quantification is carried out via an internal standard. The contents of free GMS and GMS carbonate are obtained. Quantification of glycerol monostearate (GMS) and glycerol monostearate carbonate (GMS carbonate) in polycarbonate by GC-FID:

About 0.5 g of sample is dissolved in 5 ml of CH$_2$Cl$_2$, and internal standard (e.g. n-alkane) is added. About 5 ml of tert.-butyl methyl ether (MTBE) are added to this solution in order to precipitate the polymer. The suspension is then shaken and then centrifuged. A given amount (3 ml) of the supernatant solution is removed using a pipette and concentrated to dryness under a nitrogen atmosphere. The residue is silylated with MSTFA solution (N-methyl-N-(trimethylsilyl)-trifluoroacetamide). The filtered solution is chromatographed by gas chromatography (GC) (e.g. HP 6890). Detection is carried out by flame ionisation detector (FID).

Analytical Procedure for Determining Residual Monomers:

The sample is dissolved in dichloromethane and reprecipitated from acetone/methanol. The precipitate polymer is separated off and the filtrate is concentrated. Quantification of the residual monomers is carried out by reverse phase. Chromatography in the mobile phase gradient 0.04% phosphoric acid-acetonitrile. Detection is effected by UV.

In this manner, bisphenol (BPA), phenol, tert.-butylphenol (BUP), diphenyl carbonate (DPC) and di-BUP carbonate are determined.

Materials used:

| Polycarbonate A: | relative solution viscosity | 1.204 |
| --- | --- | --- |
| | content of phenolic OH | 500 ppm |
| | DPC | 500 ppm |
| | BPA | 20 ppm |
| | phenol | 100 ppm |

Inhibitor A:

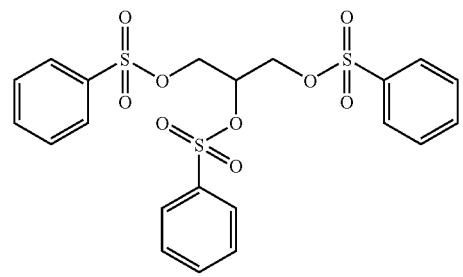

(Ia)

Inhibitor B:

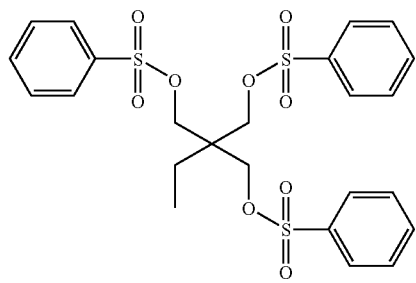

(If)

Inhibitor C:

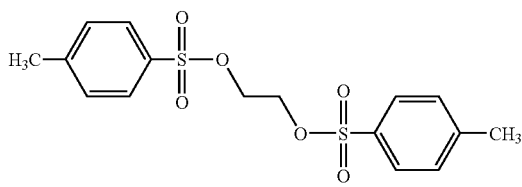

(Ic)

The effect of the inhibitors according to the invention on the improvement in the heat stability of a polycarbonate is studied by means of the long-term thermal load capacity of the polycarbonate.

Example A

Synthesis of Inhibitor A

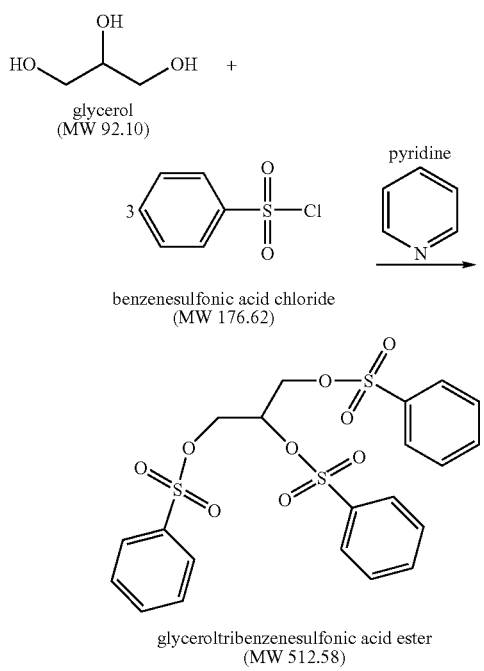

552.6 g (6.0 mol.) of glycerol from KMF and 4746 g (60 mol.) of pyridine from Aldrich are placed under nitrogen and dissolved homogeneously. 3196.8 g (18.1 mol.) of benzenesulfonic acid chloride are added dropwise very slowly, during which the temperature should not exceed 30-35° C. Stirring is then carried out for one hour at 40° C.

Working up:

The batch is added very slowly to a mixture of 3 litres of distilled water, about 4 kg of ice and 3 litres of dichloromethane, with vigorous stirring. During the addition, a temperature of 35° C. should not be exceeded.

The organic phase is then precipitated in about 10 litres of methanol, filtered off with suction and washed with methanol until thin-layer chromatography indicates that the product is clean.

Drying is then carried out to constant weight in a vacuum drying cabinet at 60° C.

Yield: 970 g (31.54% of theory) of white powder

Analysis:

melting point m.p. 81-83° C. $^1$H-NMR (400 MHz, TMS, CDCl$_3$) δ=7.8 ppm (m, 6H), 7.7 (m, 3H), 7.55 (m, 6H), 4.75 (m, 1H), 4.1 (d, 4H).

Example 1

2.5 ppm of inhibitor A, based on the amount of polycarbonate used, are added to the starting polycarbonate A, and the mixture is rendered inert with nitrogen and a vacuum. The sample is immersed in a bath which has been pre-heated to 300° C. and is melted for 20 minutes under a high vacuum, without stirring. As soon as the sample has melted, the stirrer is switched on and a small amount of sample is removed. Stirring is carried out for a further 2 hours, small samples being taken after 30, 60 and 120 minutes.

The relative viscosity and the residual monomer content of these samples are determined (Table 1).

Example 2

As Example 1 but with 2.5 ppm of inhibitor B.

Example 3

As Example 1 but with 2.5 ppm of inhibitor C.

Comparison Example 1

As Example 1 but without inhibitor.

Comparison Example 2

As Example 1 but with 2.5 ppm of ethyl tosylate as inhibitor.

Comparison Example 3

As Example 1 but with 2.5 ppm of ortho-phosphoric acid as inhibitor.

TABLE 1

| | Inhibitor/ ppm | −20 min | 0 min | 30 min | 60 min | 120 min | Δ (120 − 20) min |
|---|---|---|---|---|---|---|---|
| | (relative viscosity * 100) − 100 | | | | | | |
| Ex. 1 | 2.5 ppm inhibitor A | 20.4 | 20.3 | 21.0 | — | 21.0 | 0.6 |
| Ex. 2 | 2.5 ppm inhibitor B | 20.4 | 20.9 | 21.9 | — | 22.3 | 1.9 |
| Ex. 3 | 2.5 ppm inhibitor C | 20.4 | 20.9 | 21.9 | 22.3 | 22.9 | 2.5 |

TABLE 1-continued

| | Inhibitor/ppm | −20 min | 0 min | 30 min | 60 min | 120 min | Δ (120 − 20) min |
|---|---|---|---|---|---|---|---|
| Comp. Ex. 1 | without | 20.4 | 21.1 | 23.4 | 24.6 | 26.0 | 5.6 |
| Comp. Ex. 2 | 2.5 ppm ethyl tosylate inhibitor | 20.4 | 21.2 | 22.0 | — | 23.1 | 2.7 |
| Comp. Ex. 3 | 2.5 ppm ortho-phosphoric acid inhibitor | 20.4 | 20.7 | 21.7 | 22.6 | 23.7 | 3.3 |
| | | DPC/ppm | | | | | |
| Ex. 1 | 2.5 ppm inhibitor A | 488 | 292 | 54 | — | 43 | — |
| Ex. 2 | 2.5 ppm inhibitor B | 488 | 173 | 25 | — | 7 | — |
| Ex. 3 | 2.5 ppm inhibitor C | 488 | 256 | 88 | — | 50 | — |
| Comp. Ex. 1 | without | 488 | 245 | 192 | — | 179 | — |
| Comp. Ex. 2 | 2.5 ppm ethyl tosylate inhibitor | 488 | 252 | 182 | — | 223 | — |
| Comp. Ex. 3 | 2.5 ppm ortho-phosphoric acid inhibitor | 488 | 153 | 109 | — | 90 | — |

These Examples show the positive behaviour of the inhibitors according to the invention compared with tests without inhibitor, with an unbridged inhibitor and with a relatively readily volatile acid in respect of the suppression of the condensation activity of the polycarbonate (small rise in relative viscosity in vacuo) while at the same time efficiently reducing residual monomers, shown in the diphenyl carbonate (DPC) example.

Studies of the corrosion of the materials 1.4571 and 2.4605 in polycarbonate to which 0.41 wt. % of inhibitor C has been added show no corrosion after exposure for a period of 600 hours at 300° C. (rate of wear <0.01 mm/a).

The effect of the inhibitors according to the invention in suppressing the catalytic activity of a polycarbonate was also studied by means of the metering of glycerol monostearate.

Example 4

A 4600 kg/h stream of polycarbonate melt having a relative viscosity of 1200 is equipped with GMS in order to improve the mold release behaviour. For this purpose, 400 kg of polycarbonate granules/h are melted at 290° C. in a twin-shaft extruder having a shaft diameter of 70 mm. 46 g/h of inhibitor C (1 ppm, based on the polycarbonate stream) dissolved in a phenol/water mixture (90:10) are metered in via an open housing of the extruder, through which polycarbonate melt has already been fed. Shortly thereafter, 1560 g of liquid GMS/h at a melt temperature of 90° C. are metered into the same extruder, via a pipe, into a further open housing. Some nitrogen is passed into both open housings in order to render the mixtures inert. The melt leaving the extruder is taken over by a gear pump and pumped into the main melt stream, which is at a temperature of 288° C. The point at which the melt streams are brought together is immediately followed, in the direction of flow, by a static mixer, which distributes the additive homogeneously in the melt stream as a whole. The melt is then discharged and granulated. The values shown in Table 2 are measured in the product.

Comparison Example 4

As Example 4 but without the addition of an inhibitor.

TABLE 2

| | $GMS_{free}$/ppm | $GMS\text{-}CO_3$/ppm | $GMS_{incorporated}$/ppm |
|---|---|---|---|
| Ex. 4 | 242 | 35 | 66 |
| Comp. Ex. 4 | 81 | 239 | 23 |

The positive effect of the addition of the inhibitor according to the invention on the stability of the free mold release agent on incorporation into the polymer melt may clearly be seen.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the melt transesterification process for the preparation of polycarbonate which process includes a medium viscosity reactor and a high viscosity reactor the improvement comprising adding to the process between said reactors at least one bridged ester of organic sulphur-containing acid conforming to a formula selected from the group consisting of formula (I)

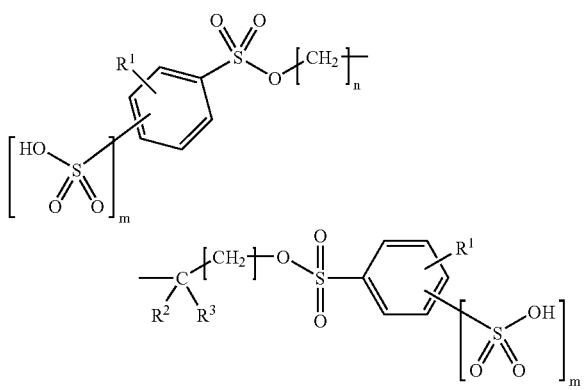

in which
the substituents $R^1$ independently of one another represent hydrogen or unsubstituted or halo-substituted $C_1$-$C_{20}$-alkyl,
$R^2$ and $R^3$ independently of one another represent hydrogen, $C_1$-$C_6$-alkyl or $C_4$-$C_{30}$-alkylcarboxyl or $R^2$ and $R^3$ represent the radical

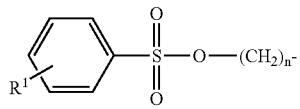

wherein
$R^1$ has the meaning given above,
m independently one of the other denotes 0 or 1,
n represents an integer from 0 to 8, formula (II)
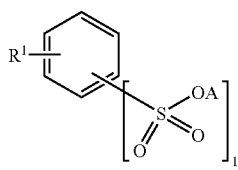
in which
R¹ has the meaning given above,
A independently of one another represents hydrogen or C₁-C₁₂-alkyl,
l represents 2 or 3,
formula (IV)
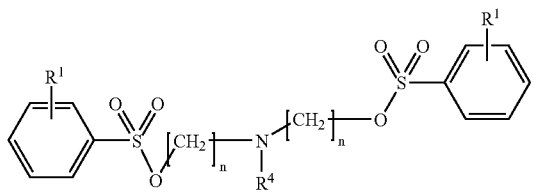
in which
R¹ and n have the meaning given above, and
R⁴ represents C₄-C₃₀-alkylcarboxyl, or
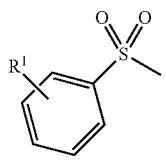
wherein R¹ has the meaning given above
formula (V)
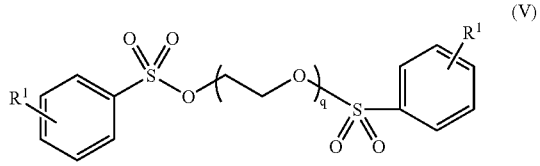
formula (VI)
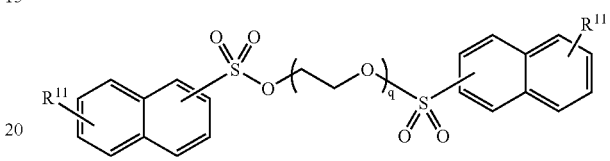
formula (VIIa)
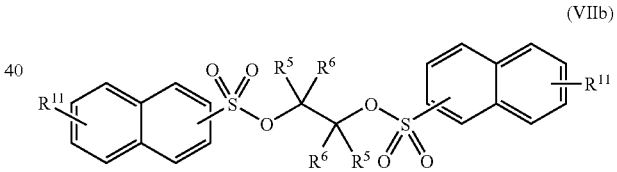
formula (VIIb)
formulas (Ib) and (IVa)
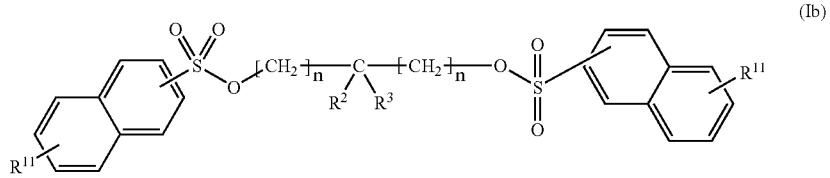
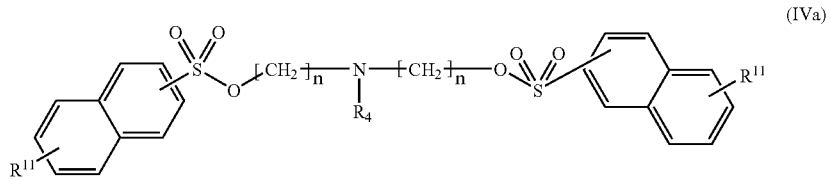

in which
R$^1$ and n have the meaning given above, and
P represents an integer from 0 to 10,
R$^5$ and R$^6$ independently of one another represent hydrogen or C$_1$-C$_{20}$-alkyl and
R$^{11}$ independently of one another represents hydrogen or di-(C$_1$-C$_4$-alkylamino,
formula (VIII)

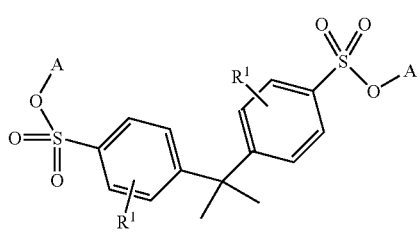

(VIII)

in which
R$^1$ and A have the meaning given above, formula (IX)

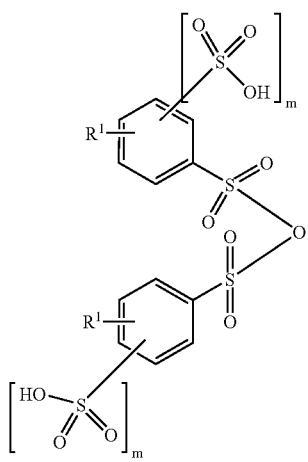

(IX)

in which
R$^1$ and m have the meaning given above,
formula (X)

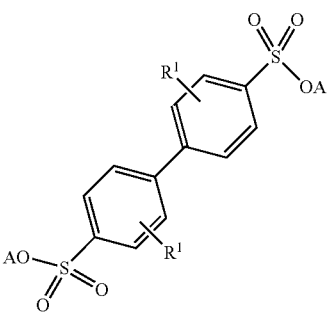

(X)

in which
R$^1$ and A have the meaning given above and
formula (XI)

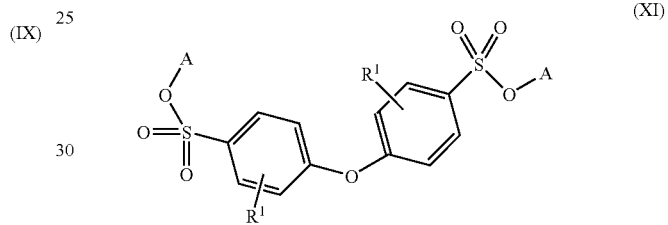

(XI)

in which
R$^1$ and A have the meaning given above.

2. The process according to claim 1, wherein the amount of ester is a positive amount up to 100 ppm relative to the weight of the polycarbonate.

3. A method of using the bridged ester of claim 1 for inhibiting catalytically active impurities in the melt transesterification process for preparing polycarbonate.

* * * * *